May 23, 1939. O. E. SIMMONDS 2,159,866
BOLT AND LIKE EXTERNALLY SCREW-THREADED MEMBERS
Filed June 21, 1938
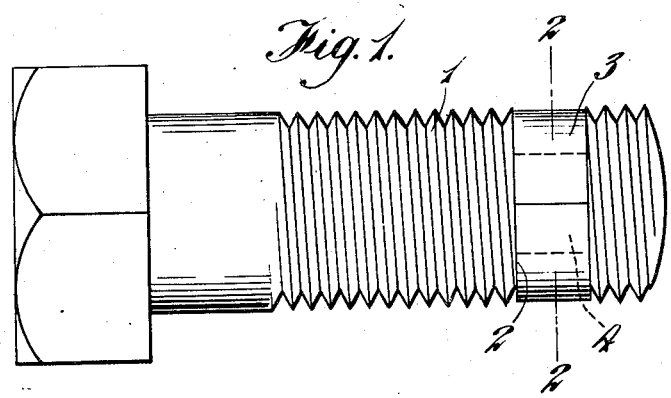
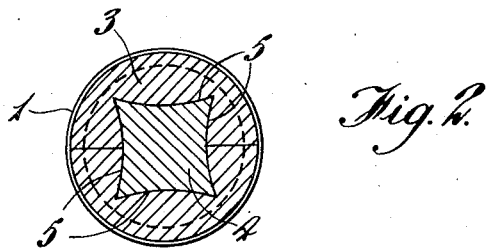
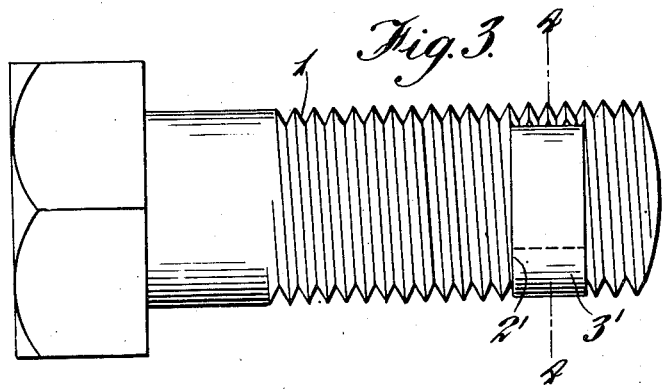
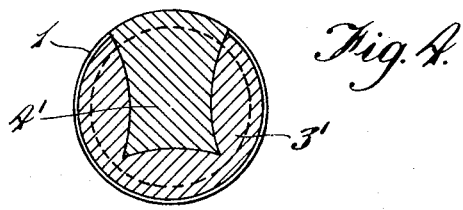
INVENTOR
OLIVER E. SIMMONDS
BY *Norris & Bateman*
ATTORNEYS Patented May 23, 1939

2,159,866

UNITED STATES PATENT OFFICE 2,159,866

BOLT AND LIKE EXTERNALLY SCREW-THREADED MEMBERS

Oliver Edwin Simmonds, London, England, assignor to Simmonds Development Corporation Limited, London, England Application June 21, 1938, Serial No. 214,998
In Great Britain June 28, 1937

3 Claims. (Cl. 151—7)

This invention relates to bolts, studs, and other like externally screw-threaded members, hereinafter referred to as a bolt, and has for its object to provide a bolt which is self-locking, so that unintentional relative movement, due to shocks or vibrations, between the bolt and a nut or other part into which it is screwed, hereinafter referred to as a nut, is effectively prevented, but which does not offer undue resistance when it is desired to loosen the bolt, for example, by means of a spanner.

The self-locking bolt according to this invention has a recess formed in the screw-threaded shank thereof and an inset of elastic material, preferably hard vulcanized fibre, which substantially corresponds in shape to said recess, is inserted within such recess, the outer or arcuate side of the elastic inset being of such length that it subtends at the axis of the bolt an angle of at least 60°, and preferably at least 90°, and such outer or arcuate side extending beyond the inner edge of the screw threads of the bolt, but preferably not beyond the outer edge of such screw threads, so that, when a nut is screwed on to the bolt, the threads of the nut penetrate into the elastic inset and unintentional relative rotary movement between the bolt and nut is prevented.

The elastic inset may be of any suitable shape, for example, it may be, in cross-section, in the form of a major or minor sector or of a major or minor segment, the recess in the bolt shank being of corresponding shape, and means may, if desired, be provided to secure the elastic inset in its recess against unintentional withdrawal.

The recess in the bolt shank advantageously extends completely or substantially completely round the bolt shank, and the elastic inset may be of annular or mutilated annular form. Where the elastic inset consists of an annular disc or plurality of such discs, means are advantageously provided to prevent relative rotary movement between the bolt and the elastic inset. For example, a wall or walls of the said recess may be formed with one or more projections which are caused to penetrate into the elastic inset when it is inserted in the recess.

In the present preferred form of bolt in accordance with the invention, the recess extends completely round an intermediate part of the bolt shank and the elastic inset is formed of a plurality of parts, the recessed part of the bolt shank and the inset parts being of such shape that unintentional withdrawal of the inset parts from the recess is prevented.

The invention is illustrated in the accompanying drawing, in which:

Figure 1 is a side elevation of a preferred form of bolt,

Figure 2 is a section taken on the line 2—2 of Figure 1,

Figure 3 is a side elevation of another form, and

Figure 4 is a section taken on the line 4—4 of Figure 3.

Referring first to Figures 1 and 2, the shank 1 of the bolt is cut away at an intermediate part thereof to form a recess 2 in which the elastic inset 3, substantially corresponding in shape to said recess, is housed. The outer arcuate side of the elastic inset extends beyond the inner edge of the screw threads, but not beyond the outer edge thereof, i. e., the periphery of such inset has a diameter greater than the minimum diameter of the screw threads and less than the maximum diameter thereof, and the said inset is formed of two parts which are symmetrical about a vertical plane. The shank is so cut away that the remaining part 4 forms, in cross-section, a curvilinear figure having four concave sides 5, the projecting corners of the bolt shank thereby formed engaging corresponding recesses in the elastic inset to secure the inset parts in the recess against unintentional lateral withdrawal, relative rotary movement between the elastic inset and bolt being also effectively prevented.

In the modified form of bolt illustrated in Figures 3 and 4, the recess 2' in the bolt shank 1 extends only partly round the shank and the elastic inset 3' consists of a single part which is sprung into its recess, the projecting corners of the shank part 4' securing the elastic inset in the recess against unintentional lateral withdrawal.

The recess in the shank of the bolt may, if desired, be formed above the screw-threaded part thereof, or at the outer end of the bolt shank. In the latter case, the recess is preferably of annular shape, the elastic inset being secured therein in any suitable manner. For example, the recess and elastic inset may be of such depth that the shank of the bolt extends beyond the outer end of the elastic inset, the projecting end of the shank being clenched or riveted over securely to retain the elastic inset in its recess.

If desired, a plurality of elastic insets may be secured within suitably spaced apart recesses in the bolt shank.

Due to the relatively large area of the elastic inset which is impressed with the thread of a nut when the bolt is screwed thereinto, the bolt is locked to the nut very effectively against unintentional displacement.

I claim:

1. A self-locking bolt comprising a screw-threaded shank formed with a recess therein which extends at least substantially completely round an intermediate part of said shank, an inset of elastic material substantially corresponding in shape to said recess housed within said recess, the outer arcuate side of said inset being concentric with the bolt axis and extending beyond the inner edge of the screw threads of the shank, and the recessed part of the shank forming, in cross-section, a curvilinear figure having at least three concave sides whereby the inset is secured in its recess against unintentional lateral withdrawal.

2. A self-locking bolt comprising a screw-threaded shank formed with a recess which extends completely round an intermediate part of said shank, an inset of elastic material, which substantially corresponds in shape to said recess and which is formed of two parts, housed within said recess, the outer arcuate side of said inset being concentric with the bolt axis and extending beyond the inner edge of the screw threads of the shank, and the recessed part of the shank forming, in cross-section, a curvilinear figure having four concave sides whereby the inset is secured in its recess against unintentional lateral withdrawal.

3. A self-locking bolt comprising a screw-threaded shank, a recess extending completely round an intermediate part of said shank and of such shape that the shank at the recess therein forms, in cross-section, a curvilinear figure having four concave sides, and an elastic inset, which substantially corresponds in shape to said recess and which is formed of two parts which are substantially symmetrical about a vertical plane, housed within said recess, the periphery of said inset being concentric with the bolt axis and having a diameter which is greater than the minimum diameter of the screw threads of the shank and which is less than the maximum diameter thereof, whereby, when a nut is screwed on to the bolt, the threads of the nut penetrate into the elastic inset and unintentional relative rotary movement between the nut and bolt is prevented.

OLIVER EDWIN SIMMONDS.